(12) United States Patent
Krishnan et al.

(10) Patent No.: US 11,263,551 B2
(45) Date of Patent: Mar. 1, 2022

(54) MACHINE LEARNING BASED PROCESS FLOW ENGINE

(71) Applicant: SAP SE, Walldorf (DE)

(72) Inventors: Kavitha Krishnan, Bangalore (IN); Kumar Nitesh, Bangalore (IN); Naga Sai Narasimha Guru Charan Koduri, Vijayawada (IN)

(73) Assignee: SAP SE, Walldorf (DE)

( * ) Notice: Subject to any disclaimer, the term of this patent is extended or adjusted under 35 U.S.C. 154(b) by 643 days.

(21) Appl. No.: 16/184,651

(22) Filed: Nov. 8, 2018

(65) Prior Publication Data

US 2020/0151615 A1 May 14, 2020

(51) Int. Cl.
| | | |
|---|---|---|
| *G06N 99/00* | (2019.01) | |
| *G06Q 30/06* | (2012.01) | |
| *G06F 17/30* | (2006.01) | |
| *G06N 20/00* | (2019.01) | |
| *G06N 7/08* | (2006.01) | |
| *G06F 40/154* | (2020.01) | |

(52) U.S. Cl.
CPC ........... *G06N 20/00* (2019.01); *G06F 40/154* (2020.01); *G06N 7/08* (2013.01)

(58) Field of Classification Search
CPC .......... G06N 20/00; G06N 7/08; G06N 7/005; G06F 40/154
USPC ...................................................... 706/1–62
See application file for complete search history.

(56) References Cited

U.S. PATENT DOCUMENTS

| | | | |
|---|---|---|---|
| 9,058,327 B1* | 6/2015 | Lehrman ................. | G06F 16/93 |
| 2006/0039593 A1* | 2/2006 | Sammak ............ | G06K 9/00127 |
| | | | 382/133 |
| 2011/0043652 A1* | 2/2011 | King ..................... | G06F 40/194 |
| | | | 348/222.1 |
| 2016/0350834 A1* | 12/2016 | Wilson .................... | G06N 3/084 |
| 2017/0140262 A1* | 5/2017 | Wilson ............... | G06Q 30/0282 |
| 2018/0357564 A1* | 12/2018 | Braghin ................... | G06N 5/04 |
| 2019/0108228 A1* | 4/2019 | Zeng .................... | G06N 3/0454 |
| 2019/0197487 A1* | 6/2019 | Jersin .................... | G06F 16/635 |
| 2019/0318407 A1* | 10/2019 | Giridhari ............... | G06N 20/00 |
| 2020/0077892 A1* | 3/2020 | Tran ..................... | A61B 5/0006 |

* cited by examiner

*Primary Examiner* — Brandon S Cole
(74) *Attorney, Agent, or Firm* — Mintz Levin Cohn Ferris Glovsky and Popeo, P.C.

(57) ABSTRACT

A method for machine-learning based process flow recommendation is provided. The method may include training a machine-learning model by at least processing training data with the machine-learning model. The training data may include a matrix representing one or more existing process flows by at least indicating actions that are performed on a document object to generate a subsequent document object. An indication that a first document object is created as part of a process flow may be received. In response to the indication, the trained machine-learning model may be applied to generate a recommendation to perform, as part of the process flow, an action to generate a second document object. Related systems and articles of manufacture, including computer program products, are also provided.

18 Claims, 6 Drawing Sheets

1

MACHINE LEARNING BASED PROCESS FLOW ENGINE

TECHNICAL FIELD

The subject matter described herein relates generally to database processing and more specifically to the use of machine-learning in generating recommendations for forming a process flow.

BACKGROUND

A document object may include structured data in the form of Extensible Markup Language (XML), JavaScript Object Notation (JSON), and/or the like. For example, an XML document may include a plurality of XML elements such as, for example, headings, paragraphs, tables, hyperlinks, and/or the like. Alternatively and/or additionally, a JSON document may include a plurality of key value pairs. The key may be a string value identifying the corresponding value, which may be any type of data including, for example, an array, a Boolean value, a number, an object, a string, and/or the like. Structured data in the form of XML, JSON, and/or the like may enable a variety of document objects to be stored in a data repository such as, for example, a database, a key-value store, and/or the like. Furthermore, structured data may enable document objects to be exchanged and/or accessed remotely (e.g., over the Internet) and across different computing systems.

SUMMARY

Systems, methods, and articles of manufacture, including computer program products, are provided for using a machine-learning model to generate recommendations for forming a process flow. In one aspect, there is provided a system. The system may include at least one data processor and at least one memory. The at least one memory may store instructions that result in operations when executed by the at least one data processor. The operations may include: training a machine-learning model by at least processing training data with the machine-learning model, the training data including a first matrix representing one or more existing process flows by at least indicating one or more actions that are performed on a document object to generate a subsequent document object; receiving an indication of a first document object being created as part of a process flow; and in response to the indication, applying the trained machine-learning model to generate a recommendation to perform, as part of the process flow, a first action to generate a second document object.

In some variations, one or more features disclosed herein including the following features may optionally be included in any feasible combination. The first matrix may further indicate a frequency that the one or more actions are performed on the document object to generate the subsequent document object.

In some variations, the machine-learning model may be trained to recommend the first action instead of a second action based at least on the process flow including the first action having a higher conformation metric than another process flow including the second action. The conformation metric of the process flow may correspond to a sum of frequencies of a sequence of actions included in the process flow. The machine-learning model may be trained to recommend the first action having a lower individual frequency than the second action in order to form the process flow having the higher conformation metric.

In some variations, the first matrix may further indicate a frequency of each of the one or more actions performed on the document object to generate the subsequent document object.

In some variations, the first matrix may be converted to a second matrix prior to being used to train the machine-learning model. The second matrix may indicate the subsequent document object that is generated in response to the one or more actions being performed on the document object. The second matrix may further indicate a frequency of the subsequent document object being generated as a response to the one or more actions being performed on the document object. The first matrix and the second matrix may correspond to at least one directed graph representative of the one or more existing process flows. The at least one directed graph may include a plurality of nodes corresponding to the document object and the subsequent document object. The at least one directed graph may further include at least one edge corresponding to the one or more actions.

In some variations, the machine-learning model may be a Markov Decision Process model.

In some variations, the machine-learning model may be trained using a reinforcement training technique. The reinforcement training technique may include Q-learning, Monte Carlo, state-action-reward-state-action, deep Q network, deep deterministic policy gradient, asynchronous actor-critic algorithm, trust region policy optimization, and/or proximal policy optimization.

In another aspect, there is provided a method for using a machine-learning model to generate recommendations for forming a process flow. The method may include: training a machine-learning model by at least processing training data with the machine-learning model, the training data including a first matrix representing one or more existing process flows by at least indicating one or more actions that are performed on a document object to generate a subsequent document object; receiving an indication of a first document object being created as part of a process flow; and in response to the indication, applying the trained machine-learning model to generate a recommendation to perform, as part of the process flow, a first action to generate a second document object.

In some variations, one or more features disclosed herein including the following features may optionally be included in any feasible combination. The first matrix may further indicate a frequency that the one or more actions are performed on the document object to generate the subsequent document object.

In some variations, the machine-learning model may be trained to recommend the first action instead of a second action based at least on the process flow including the first action having a higher conformation metric than another process flow including the second action. The conformation metric of the process flow may correspond to a sum of frequencies of a sequence of actions included in the process flow. The machine-learning model may be trained to recommend the first action having a lower individual frequency than the second action in order to form the process flow having the higher conformation metric.

In some variations, the first matrix may further indicate a frequency of each of the one or more actions performed on the document object to generate the subsequent document object.

In some variations, the first matrix may be converted to a second matrix prior to being used to train the machine-learning model. The second matrix may indicate the subsequent document object that is generated in response to the one or more actions being performed on the document object. The second matrix may further indicate a frequency of the subsequent document object being generated as a response to the one or more actions being performed on the document object. The first matrix and the second matrix may correspond to at least one directed graph representative of the one or more existing process flows. The at least one directed graph may include a plurality of nodes corresponding to the document object and the subsequent document object. The at least one directed graph may further include at least one edge corresponding to the one or more actions.

In some variations, the machine-learning model may be a Markov Decision Process model.

In some variations, the machine-learning model may be trained using a reinforcement training technique that includes Q-learning, Monte Carlo, state-action-reward-state-action, deep Q network, deep deterministic policy gradient, asynchronous actor-critic algorithm, trust region policy optimization, and/or proximal policy optimization.

In another aspect, there is provided a computer program product that includes a non-transitory computer readable storage medium. The non-transitory computer-readable storage medium may include program code that causes operations when executed by at least one data processor. The operations may include: training a machine-learning model by at least processing training data with the machine-learning model, the training data including a first matrix representing one or more existing process flows by at least indicating one or more actions that are performed on a document object to generate a subsequent document object; receiving an indication of a first document object being created as part of a process flow; and in response to the indication, applying the trained machine-learning model to generate a recommendation to perform, as part of the process flow, a first action to generate a second document object.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the prediction of anomalies in the operations of a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
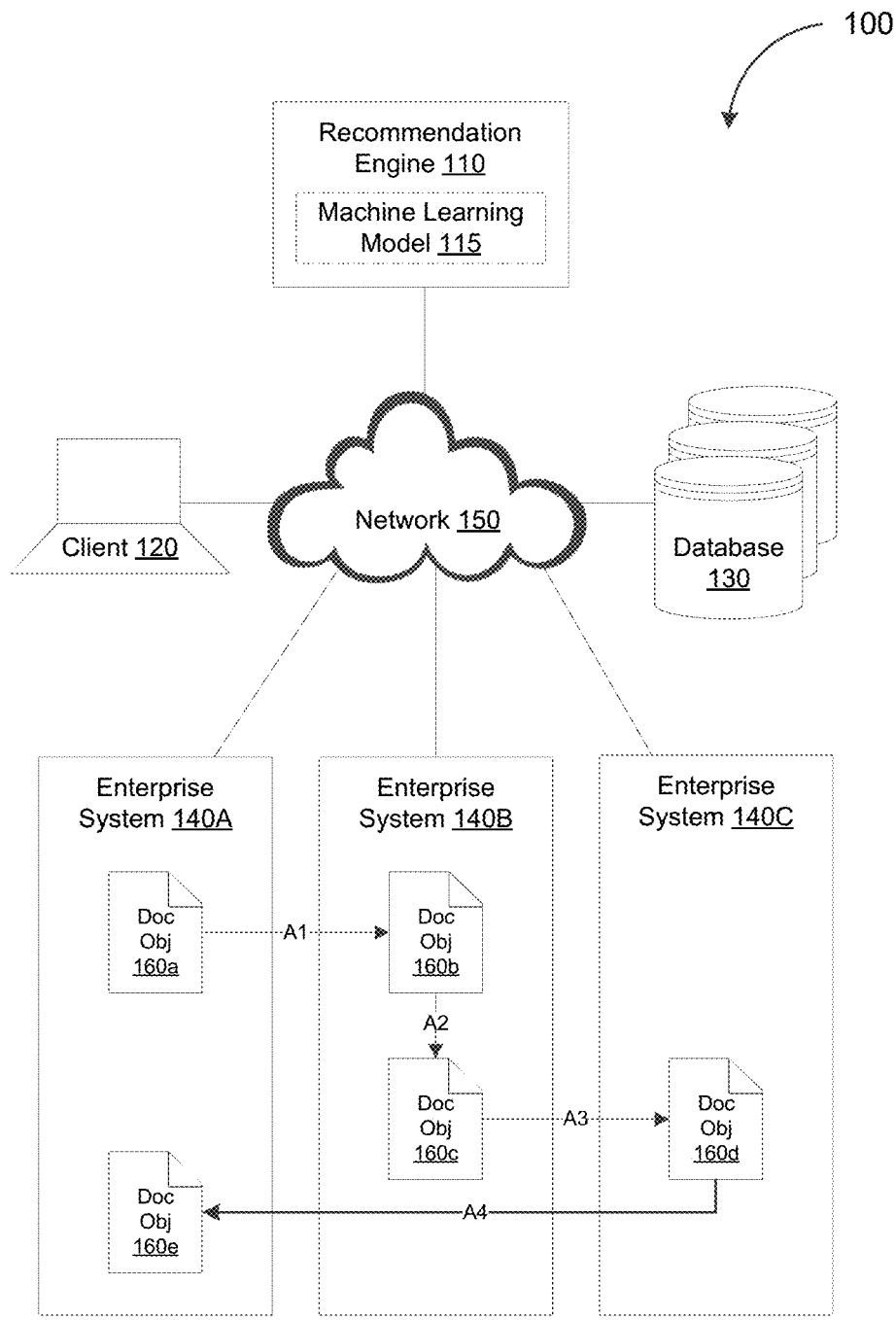
FIG. 1 depicts a system diagram illustrating a machine-learning based process flow recommendation system, in accordance with some example embodiments.

The operations of an enterprise may give rise to various document objects including, for example, sourcing requests, purchase orders, sales contracts, invoices, receipts, and/or the like. Furthermore, a series of document objects as well as the actions that trigger the generation of each successive document object in the series of document objects may form a process flow. For example, performing an action on a first document object may trigger the generation of a second document object, thereby forming a process flow. An enterprise may develop process flows to achieve a variety of objectives including, for example, procurement, resource planning, customer relationship management, and/or the like. These process flows may be required to comply with needs that are specific to the enterprise, the industry or sector associated with the enterprise, individual users within the enterprise, and/or the like. However, creating a bespoke process flow may be prohibitively expensive for some enterprises. As such, in some example embodiments, a process flow engine may be configured to generate recommendations for document objects and/or actions to include in a process flow. For instance, the process flow engine may recommend adding, to a process flow that includes a first document object, an action to perform on the first document and trigger the generation of a second document object. Alternatively and/or additionally, the process flow engine may recommend adding, to a process flow that includes an action performed on a first document object, a second document object that should be generated in response to that action.

In some example embodiments, the process flow engine may generate recommendations by at least applying a machine-learning model that has been trained to identify, based on a current document object and/or a current action, at least one subsequent action and/or document object for forming a process flow having a maximum overall conformation metric. The conformation metric of the process flow may include a sum of the frequencies at which an action is performed on a document object in the process flow to generate a subsequent document object. For example, the conformation metric for the process flow may include a sum of a first frequency at which a first action is performed on a first document object to generate a second document object and a second frequency at which a second action is performed on the second document object to generate a third document object. The machine-learning model may be trained using one or more existing process flows from the enterprise, the industry or sector associated with the enterprise, individual users within the enterprise, and/or the like. As such, by maximizing the overall conformation metric, the machine-learning model may generate recommendations for forming a process flow that is most consistent with existing process flows and thus comply with the specific needs of the enterprise, the industry or sector associated with the enterprise, individual users within the enterprise, and/or the like.

Each process flow may be a sequence of document objects and actions. As such, one or more existing process flows may be represented using a directed graph. The nodes of the directed graph may be representative of the document objects in the one or more existing process flows while the directed edges interconnecting the nodes in the directed graph may be representative of the actions in the one or more existing process flows. A directed edge interconnecting a first node and a second node may indicate that the action corresponding to the directed edge may be performed on a first document object corresponding to the first node to generate a second document object corresponding to the second node. According to some example embodiment, the directed graph may be stored, for example, in a graph database, as an adjacency matrix and/or an environment matrix. The adjacency matrix and/or the environment matrix may be generated and/or updated based on one or more existing process flows. The machine-learning model may be trained, based on the adjacency matrix and/or the environment matrix, to identify at least one document object and/or action for forming a process flow that exhibits maximum conformance to the one or more existing process flows.

In some example embodiments, the machine-learning model may be a Markov Decision Process (MDP) model that is trained using a reinforced learning technique such as, for example, Q-learning, Monte Carlo, state-action-reward-state-action (SARSA), deep Q network (DQN), deep deterministic policy gradient (DDPG), asynchronous actor-critic algorithm (A3C), trust region policy optimization (TRPO), proximal policy optimization (PPO), and/or the like. As such, the machine-learning model may be trained to maximize a cumulative reward instead of an immediate reward.

As used herein, a reward may correspond to a frequency at which an action is performed on a first document object to generate a second document object. Accordingly, maximizing a cumulative reward of a process flow instead of an immediate may require selecting a sequence of actions having an overall highest frequency that instead of merely a next action having the highest frequency. For example, when the machine-learning model is identifying a next action to perform on a current document object, the machine-learning model may identify a first action that maximizes the overall conformation metric of the resulting process flow. That is, the machine-learning model may identify the first action instead of a second action that has the highest individual conformation metric, thereby avoiding the formation of a process flow that exhibits only partial conformation to the existing process flows.

FIG. 1 depicts a system diagram illustrating a machine-learning based process flow recommendation system 100, in accordance with some example embodiments. Referring to FIG. 1, the machine-learning based process flow recommendation system 100 may include a recommendation engine 110, a client 120, and a database 130. The machine-learning based process flow recommendation engine 100 may further include one or more enterprise systems including, for example, a first enterprise system 140A, a second enterprise system 140B, a third enterprise system 140C, and/or the like. As shown in FIG. 1, the recommendation engine 110, the client 120, the database 130, the first enterprise system 140A, the second enterprise system 140B, and/or the third enterprise system 140C may be communicatively coupled via a network 150. The network 150 may be any wired and/or wireless network including, for example, a wide area network (WAN), a local area network (LAN), a virtual local area network (VLAN), a public land mobile network (PLMN), the Internet, and/or the like.

Referring again to FIG. 1, a process flow may include the creation of documents across one or more enterprise systems including, for example, the first enterprise system 140A, the second enterprise system 140B, the third enterprise system 140C, and/or the like. For instance, as shown in FIG. 1, the client 120 may initiate a process flow by at least creating a first document object 160a, for example, in the first enterprise system 140A. In some example embodiments, the recommendation engine 110 may respond to the creation of the first document object 160a by at least generating recommendations for one or more subsequent document objects and/or actions to include in the process flow. The recommendations from the recommendation engine 110 may form a process flow that is most consistent with existing process flows. Accordingly, this process flow may comply with the specific needs of a user associated with the client 120, an enterprise associated with the client 120, the industry or sector of the enterprise associated with the client 120, and/or the like.

For example, as shown in FIG. 1, the recommendation engine 110 may recommend that the client 120 perform a first action A1 on the first document object 160a in order to generate a second document object 160b in the second enterprise system 140B before performing a second action A2 on the second document object 160b in order to generate a third document object 160c in the second enterprise system 140B. The recommendation engine 110 may recommend for the client 120 to subsequently perform a third action A3 on the third document object 160c in the second enterprise system 140B in order to generate a fourth document object 160d in the third enterprise system 140C. To complete the process flow, the recommendation engine 110 may recommend that the client 120 perform a fourth action A4 on the fourth document object 160d and generate a fifth document object 160e in the first enterprise system 140A.

In some example embodiments, the recommendation engine 110 may generate the recommendations by at least applying a machine-learning model 115. The machine-learning model 115 may be trained to identify, based on a current document object and/or a current action, at least one subsequent action and/or document object for forming a process flow having a maximum overall conformation metric. The conformation metric of the process flow may include a sum of the frequencies at which an action is performed on a document object in the process flow to generate a subsequent document object. For example, the conformation metric for the process flow may include a sum of a first frequency at which the first action A1 is performed on the first document object 160a to generate the second document object 160b, a second frequency at which the second action A2 is performed on the second document object 160b to generate the third document object 160c, a third frequency at which the third action A3 is performed on the third document object 160c to generate the fourth document object 160d, and a fourth frequency at which the fourth action A4 is perform on the fourth document object 160d to generate the fifth document object 160e.

The machine-learning model 115 may be trained using one or more existing process flows from the user associated with the client 120, the enterprise associated with the client 120, the industry or sector of the enterprise associated with the client 120, and/or the like. According to some example embodiments, the one or more existing process flows may be represented using a directed graph in which the nodes of the directed graph may correspond to the document objects in the one or more existing process flows and the directed edges interconnecting the nodes in the directed graph may correspond to the actions in the one or more existing process flows. A directed edge interconnecting a first node and a second node may indicate that the action corresponding to the directed edge may be performed on a first document object corresponding to the first node to generate a second document object corresponding to the second node.

Referring again to FIG. 1, the directed graph representative of the one or more existing process flows may be stored the database 130, which may be a graph database. For instance, the directed graph representative of the one or more existing process flows may be stored, in the database 130, as an adjacency matrix and/or an environment matrix. Training the machine-learning model 115 may including processing, with the machine-learning model 115, the adjacency matrix and/or the environment matrix stored in the database 130.

In some example embodiments, the machine-learning model 115 may be trained using an environment matrix that is generated based on a corresponding adjacency matrix. For instance, the machine-learning model 115 may be a Markov Decision Process (MDP) model that is trained based on the environment matrix. The machine-learning model 115 may be trained using a reinforced learning technique such as, for example, Q-learning, Monte Carlo, state-action-reward-state-action (SARSA), deep Q network (DQN), deep deterministic policy gradient (DDPG), asynchronous actor-critic algorithm (A3C), trust region policy optimization (TRPO), proximal policy optimization (PPO), and/or the like. As noted, the machine-learning model 115 may be trained to identify at least one document object and/or action for forming a process flow that is most consistent with the one or more existing process flows.

Figure 2:
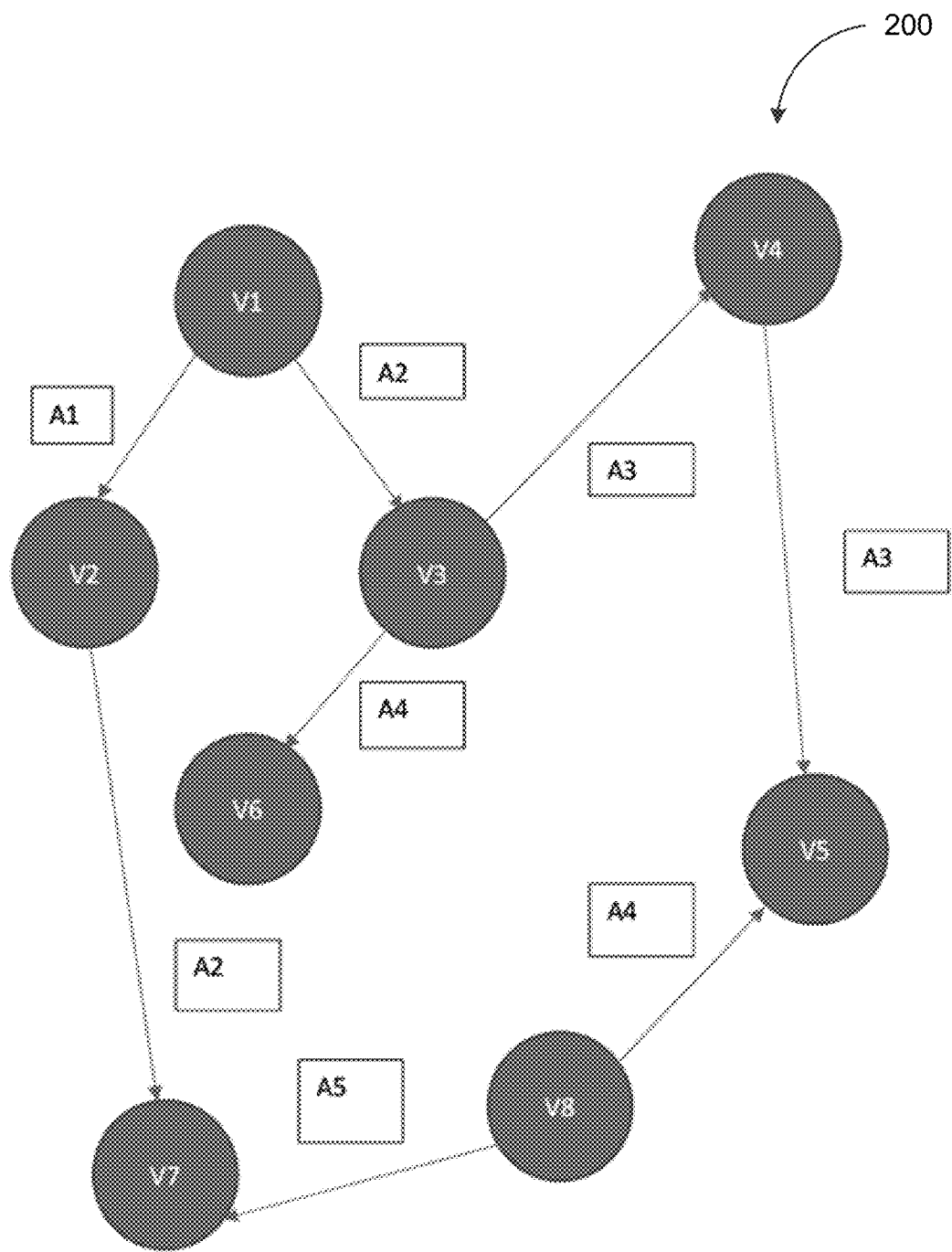
FIG. 2 depicts a directed graph representative of a process flow, in accordance with some example embodiments.

To further illustrate, FIG. 2 depicts a directed graph 200 representative of a process flow, in accordance with some example embodiments. As shown in FIG. 2, the directed graph 200 may include a plurality of nodes corresponding to a plurality of document objects that are part of the process flow including, for example, a first document object V1, a second document object V2, a third document object V3, a fourth document object V4, a fifth document object V5, a sixth document object V6, a seventh document object V7, and an eighth document object V8. The plurality of nodes included in the directed graph 200 may be interconnected by a plurality of directed edges corresponding to a plurality of actions forming the process flow including, for example, a first action A1, a second action A2, a third action A3, a fourth action A4, and a fifth action A5.

As noted, a directed edge interconnecting two nodes may indicate that the action corresponding to the directed edge may be performed on a document object corresponding to one node to generate a document object corresponding to the other node. For example, to indicate that the first action A1 may be performed on the first document object V1 to generate the second document object V2, a directed edge corresponding to the first action A1 may interconnect a first node corresponding to the first document object V1 and a second node corresponding to the second document object V2. Alternatively and/or additionally, a directed edge corresponding to the second action A2 may interconnect the second node corresponding to the second document object V2 and a third node corresponding to the seventh document object V7, thereby indicating that the second action A2 may be performed on the second document object A2 to generate the seventh document object A7. Accordingly, the process flow corresponding to the directed graph 200 may include performing the first action A1 on the first document object V1 to generate the second document object V2 before performing the second action A2 on the second document object V2 to generate the seventh document object V7.

Figure 3A:
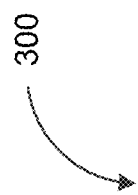
FIG. 3A depicts an adjacency matrix representative of one or more process flows, in accordance with some example embodiments.

FIG. 3A depicts an adjacency matrix 300 representative of one or more process flows, in accordance with some example embodiments. Referring to FIG. 3A, in some example embodiments, the adjacency matrix 300 may be generated based on one or more directed graphs representative of existing process flows such as, for example, the directed graph 200. As shown in FIG. 3A, at least some of the cells in the adjacency matrix 300 may store actions that are performed on one document object to generate another document object. Moreover, each action present in the adjacency matrix 300 may be associated with the frequency with which the action is performed on the one document object to generate the other document object. The cells in the adjacency matrix 300 may be updated based on one or more existing process flows. In doing so, the adjacency matrix 300 may indicate the frequency at which various actions are performed on document objects to generate other document objects in the existing process flows of the user associated with the client 120, the enterprise associated with the client 120, the industry or sector of the enterprise associated with the client 120, and/or the like.

For example, FIG. 3A shows that the adjacency matrix 300 may include a first cell occupied by the first action A1 and a first frequency $f_1$, a second cell occupied by the second action A2 and a second frequency $f_2$, and a third cell occupied by the third action A3 and a third frequency $f_3$. Accordingly, the adjacency matrix 300 may indicate that the first action A1 may be performed at the first frequency of $f_1$ on the first document object V1 to generate the second document object V2 while the second action A2 may be performed at the second frequency of $f_2$ on the first document object V1 to generate the third document object V3. The adjacency matrix 300 may further indicate that the third action A3 may be performed at the third frequency $f_3$ on the third document object V3 to generate the fourth document object V4.

Figure 3B:
FIG. 3B depicts an environment matrix representative of one or more process flows, in accordance with some example embodiments.

FIG. 3B depicts an environment matrix 350 representative of one or more process flows, in accordance with some example embodiments. Referring to FIGS. 2 and 3A-B, the environment matrix 350 may also correspond to the directed graph 200. Moreover, in some example embodiments, the environment matrix 350 may be generated based on the adjacency matrix 300. Whereas the cells in the adjacency matrix 300 store actions that are performed on one document object to generate another document object, at least some of the cells of the environment matrix 350 may store document objects that are generated by performing an action on another document object. These cells in the environment matrix 350 may further store the corresponding frequency at which the document objects are generated due to the performance of an action on another document object.

For example, FIG. 3B shows the environment matrix 350 as including a first cell occupied by the first frequency $f_1$ and the second document object V2, a second cell occupied by the second frequency $f_2$ and the third document object V3, and a fourth cell occupied by a seventh frequency $f_7$ and the seventh document object V7. Accordingly, the environment matrix 350 may indicate that the first action A1 may be performed on the first document object V1 to generate the second document object V2 at the first frequency $f_1$ and that the second action A2 may be performed on the first document object V1 to generate the third document object V3 at the second frequency $f_3$. The environment matrix 350 may further indicate that the second action A2 may be performed on the second document object V2 to generate the seventh document object V7 at the seventh frequency $f_7$.

In some example embodiments, the adjacency matrix 300 and the environment matrix 350 may capture one or more existing process flows of the user associated with the client 120, the enterprise associated with the client 120, the industry or sector of the enterprise associated with the client 120, and/or the like. The machine-learning model 115 may be trained based on the adjacency matrix 300 and/or the environment matrix 350 in order to learn the one or more existing process flows. Moreover, the machine-learning model 115 may be Markov Decision Process (MDP) model that is trained using a reinforced learning technique such that the machine-learning model 115 is capable of generating recommendations for forming process flows having a maximum overall conformation metric. The conformation metric of the process flow may include a sum of the frequencies at which an action is performed on a document object in the process flow to generate a subsequent document object.

For example, the conformation metric for the process flow corresponding to the directed graph 200 may include a sum of the first frequency $f_1$ at which the first action A1 is performed on the first document object V1 to generate the second document object V2, the second frequency $f_2$ at which the second action A2 is performed on the first document object V1 to generate the third document object V3, the third frequency $f_3$ at which the third action A3 is performed on the third document object V3 to generate the fourth document object V4, the fourth frequency at which the third action A3 is performed on the fourth document object V4 to generate the fifth document object V5, the fifth frequency at which the fourth action A4 is performed on the eighth document object V8 to generate the fifth document object V5, the sixth frequency $f_6$ at which the fourth action A4 is performed on the third document object V3 to generate the sixth document object V6, the seventh frequency at which the second action A2 is performed on the second document object V2 to generate the seventh document object V7, and the eighth frequency $f_8$ at which the fifth action A5 is performed on the eighth document object V8 to generate the seventh document object V7.

By training the machine-learning model 115 to generate recommendations for forming process flows having a maximum overall conformation metric, the machine-learning model 115 may generate recommendations for forming process flows that are most consistent with the existing process flows of, for example, the user associated with the client 120, the enterprise associated with the client 120, the industry or sector of the enterprise associated with the client 120, and/or the like.

As noted, the machine-learning model 115 may be a Markov Decision Process (MDP) model defined by the 5-tuple (S, A, $P_a$, $R_a$, γ), wherein S may denote a finite set of states (e.g., V1, V2, V3, V4, V5, V6, V7, and V8), A may denote a finite set of actions (e.g., A1, A2, A3, A4, and A5), $P_a(s, s')=Pr(s_{t+1}=s'|s_t=s, a_t=a)$ may refer to the probability that an action a in state s at time t may lead to state s' at time t+1, $R_a(s, s')$ may denote an immediate reward received from performing action a to transition from state s to state s', and γ∈[0, 1) may denote a discount factor corresponding to a difference between the relative importance of future rewards and immediate rewards. It should be appreciated that the value of the discount factor γ may determine the importance of future rewards relative to immediate rewards. For example, a lower discount factor γ may favor immediate rewards while a higher discount factor γ may favor future rewards.

When trained using a reinforced training technique, the machine-learning model 115 may be trained to maximize a total reward instead of an immediate reward. That is, the machine-learning model 115 may be trained to recommend a next action to form a process flow that includes a sequence actions having the highest overall frequency instead of a next action having the highest individual frequency. As noted, doing so may result in the formation of a process flow having a highest overall conformation metric and is therefore most consistent with the existing process flows of the user associated with the client 120, the enterprise associated with the client 120, the industry or sector of the enterprise associated with the client 120, and/or the like.

For example, the machine-learning model 115 may be trained using the reinforced learning technique Q-learning. The quality Q of a combination of an action performed on a document object may be expressed as Equation (1) below:

$$Q: S \times A \to \mathbb{R} \qquad (1)$$

wherein S may denote a finite set of states (e.g., V1, V2, V3, V4, V5, V6, V7, and V8) and A may denote a finite set of actions (e.g., A1, A2, A3, A4, and A5).

Prior to commencing the training of the machine-learning model 115, the value of Q may be initialized to an arbitrary value. The training of the machine-learning model 115 may be an iterative process for updating the value of Q. For example, at each time t, an action $a_t$ may be selected to trigger a transition to a new state $s_{t+1}$, the corresponding reward $r_t$ may be observed, and the value of Q may be updated. The iterative update of the value of Q may be expressed by Equation (2) below:

$$Q^{new}(s_t, a_t) \leftarrow (1-\alpha) \cdot Q(s_t, a_t) + \alpha \cdot \left( r_t + \gamma \cdot \max_a \ Q(s_{t+1}, a) \right) \qquad (2)$$

wherein $r_t$ may denote a reward observed for the current state $s_t$, α may denote a learning rate (e.g., 0≤α≤1), γ may denote the discount factor, $Q(s_t, a_t)$ may denote a value of Q from a previous iteration, and $$\max_{a} Q(s_{t+1}, a)$$

may correspond an estimated optimal future value of Q. Referring to Equation (2), it should be appreciated that the $$\left(r_t + \gamma \cdot \max_{a} Q(s_{t+1}, a)\right)$$

may correspond to a learned value.

Figure 4:
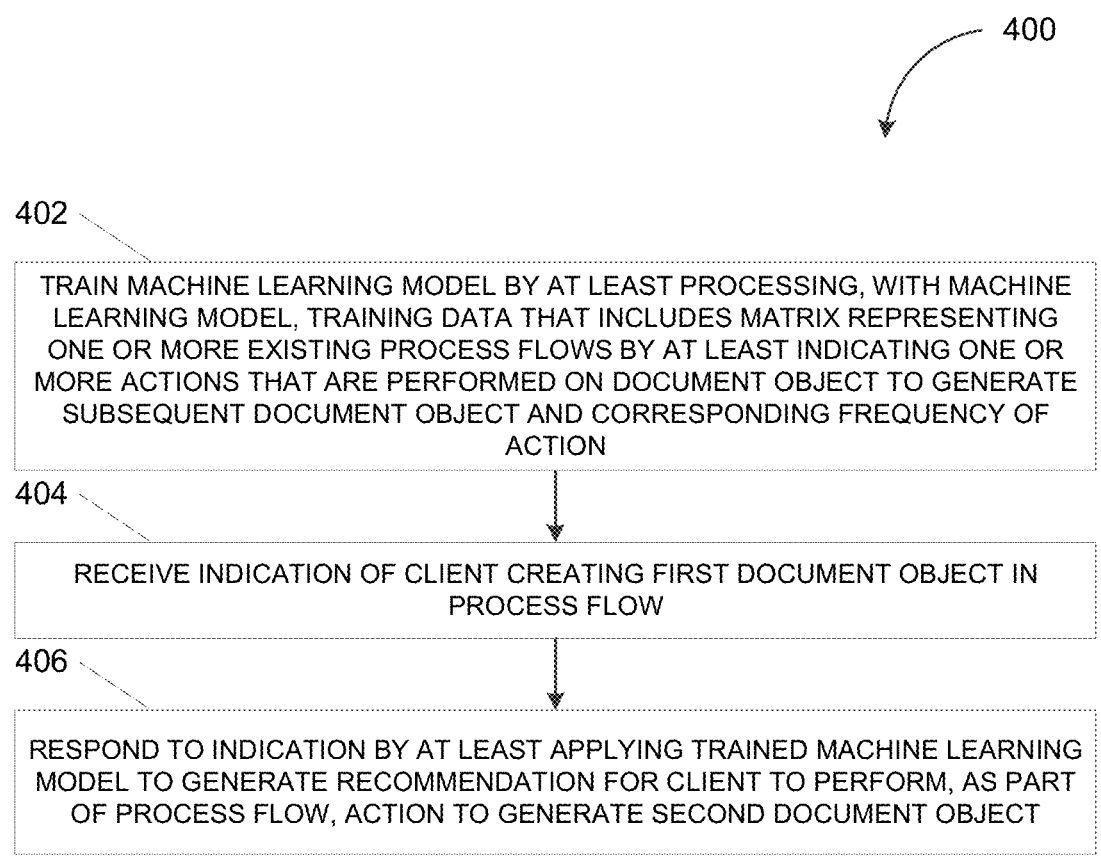
FIG. 4 depicts a flowchart illustrating a process for generating a process flow, in accordance with some example embodiments.

FIG. 4 depicts a flowchart illustrating a process 400 for generating a process flow, in accordance with some example embodiments. Referring to FIGS. 1-2, 3A-B, and 4, the process 400 may be performed by the recommendation engine 110.

At 402, the recommendation engine 110 may train the machine-learning model 115 by at least processing, with the machine-learning model 115, training data that includes a matrix representing one or more existing process flows by at least indicating one or more actions that are performed on a document object to generate a subsequent document object and a corresponding frequency of the action. For example, in some example embodiments, the machine-learning model 115 may be trained based on the environment matrix 350, which may be generated based on the adjacency matrix 300.

The adjacency matrix 300 and the environment matrix 350 may correspond one or more directed graphs (e.g., the directed graph 200) representative of the existing process flows of the user associated with the client 120, the enterprise associated with the client 120, the industry or sector of the enterprise associated with the client 120, and/or the like. For example, at least some of the cells in the adjacency matrix 300 may store actions that are performed on one document object to generate another document object. Meanwhile, at least some of the cells of the environment matrix 350 may store document objects that are generated by performing an action on another document object.

In some example embodiments, the machine-learning model 115 may be a Markov Decision Process (MDP) model that is trained using a reinforcement learning technique such as, for example, Q-learning, Monte Carlo, state-action-reward-state-action (SARSA), deep Q network (DQN), deep deterministic policy gradient (DDPG), asynchronous actor-critic algorithm (A3C), trust region policy optimization (TRPO), proximal policy optimization (PPO), and/or the like. As noted, using the reinforcement learning technique, the machine-learning model 115 may be trained to maximize an overall conformation metric when generating recommendations for subsequent actions and/or document objects to include in a process flow. The resulting process flow may therefore be most consistent with the existing process flows of the user associated with the client 120, the enterprise associated with the client 120, the industry or sector of the enterprise associated with the client 120, and/or the like.

At 404, the recommendation engine 110 may receive an indication of the client 120 creating a first document object in a process flow. For example, the recommendation engine 110 may receive an indication that the client 120 created the first document object 160a in a process flow. As shown in FIG. 1, the first document object 160a may be created in the first enterprise system 140A. The remainder of the process flow, however, may include actions that triggers the generation of additional document objects in the same and/or different enterprise systems. For instance, FIG. 1 shows that the first action A1 may be performed on the first document object 160a to create the second document object 160b at the second enterprise system 140B and that the second action A2 may be performed on the second document object 160b to create the third document object 160c at the second enterprise system 140B.

At 406, the recommendation engine 110 may respond to the indication by at least applying the trained machine-learning model 115 to generate a recommendation for the client 120 to perform, as part of the process flow, an action to generate a second document object. For example, in response to the client 120 creating the first document object 160a, the trained machine-learning model 115 may be configured to generate a recommendation for the client to perform, as part of the process flow, the first action A1 in order to generate the second document object 160b.

As noted, in some example embodiments, the machine-learning model 115 may be trained to recommend based on a current document object and/or a current action, at least one subsequent action and/or document object for forming a process flow having a maximum overall conformation metric relative to one or more existing process flows of the user associated with the client 120, the enterprise associated with the client 120, the industry or sector of the enterprise associated with the client 120, and/or the like. That is, the machine-learning model 115 may be trained to recommend a next action to form a process flow that includes a sequence actions having the highest overall frequency instead of a next action having the highest individual frequency.

For example, the machine-learning model 115 may be trained to recommend, based at least on the creation of the first document object 160a, the performance of the first action A1 to generate the second document object 160b in order to form a process flow that is most consistent with the existing process flows of the user associated with the client 120, the enterprise associated with the client 120, the industry or sector of the enterprise associated with the client 120, and/or the like. The machine-learning model 115 may be trained to recommend the first action A1 instead of another action that is performed more frequently on the first document object 160a because the inclusion of the other action may result in a process flow with a lower overall conformation metric.

Figure 5:
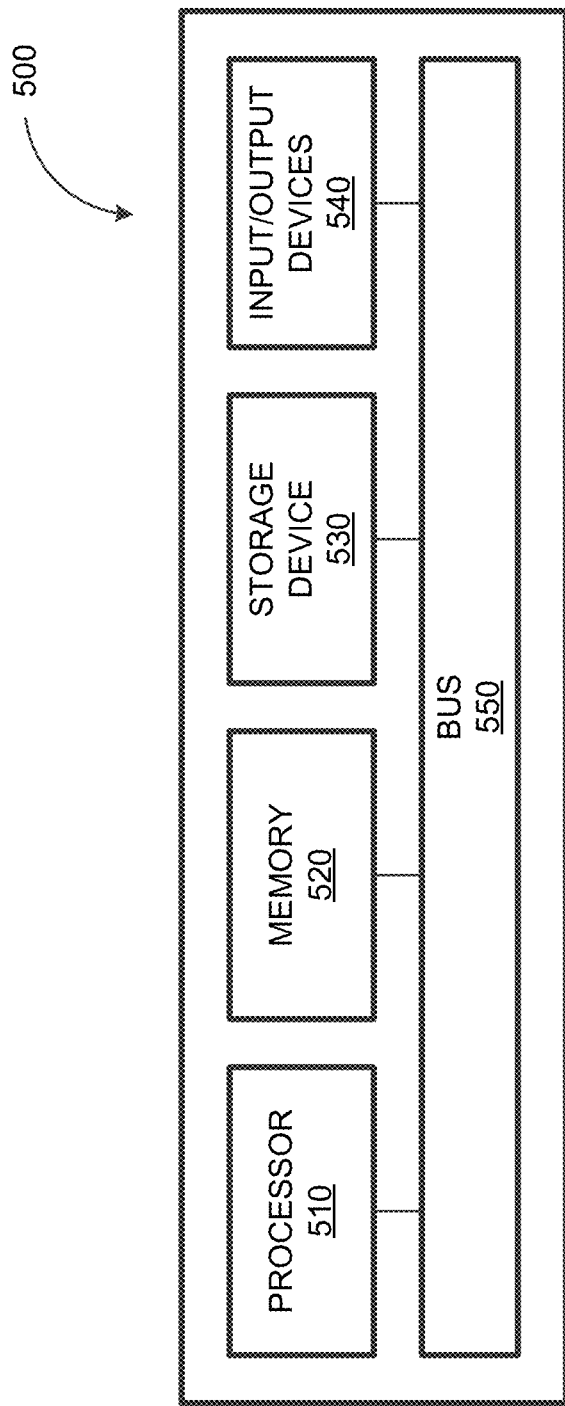
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the recommendation engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the recommendation engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid-state device, a floppy disk device, a hard disk device, an optical disk device, a tape device, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   training a machine-learning model by at least processing training data with the machine-learning model, the training data including a first matrix representing one or more existing process flows by at least indicating one or more actions that are performed on a document to generate a subsequent document, the first matrix further indicating a frequency with which each of the one or more actions are performed on the document in the one or more existing process flows to generate the subsequent document, the machine-learning model being trained, based at least on the first matrix, to identify a next action maximizing an overall frequency of a sequence actions including the next action;
   receiving an indication of a first document being created as part of a process flow; and
   in response to the indication, applying the trained machine-learning model to generate a recommendation to perform, as part of the process flow, a first action to generate a second document.

2. The system of claim 1, wherein the first matrix further indicates a frequency that the one or more actions are performed on the document to generate the subsequent document.

3. The system of claim 1, wherein the machine-learning model is trained to recommend the first action instead of a second action based at least on the process flow including the first action having a higher conformation metric than another process flow including the second action, and wherein the conformation metric of the process flow corresponds to a sum of frequencies of a sequence of actions included in the process flow.

4. The system of claim 3, wherein the machine-learning model is trained to recommend the first action having a lower individual frequency than the second action in order to form the process flow having the higher conformation metric.

5. The system of claim 1, wherein the first matrix is converted to a second matrix prior to being used to train the machine-learning model, wherein the second matrix indicates the subsequent document that is generated in response to the one or more actions being performed on the document, and wherein the second matrix further indicates a frequency of the subsequent document being generated as a response to the one or more actions being performed on the document.

6. The system of claim 5, wherein the first matrix and the second matrix correspond to at least one directed graph representative of the one or more existing process flows, wherein the at least one directed graph include a plurality of nodes corresponding to the document and the subsequent document, and wherein the at least one directed graph further include at least one edge corresponding to the one or more actions.

7. The system of claim 1, wherein the machine-learning model comprises a Markov Decision Process model.

8. The system of claim 1, wherein the machine-learning model is trained using a reinforcement training technique.

9. The system of claim 8, wherein the reinforcement training technique comprises Q-learning, Monte Carlo, state-action-reward-state-action, deep Q network, deep deterministic policy gradient, asynchronous actor-critic algorithm, trust region policy optimization, and/or proximal policy optimization.

10. A computer-implemented method, comprising:
    training a machine-learning model by at least processing training data with the machine-learning model, the training data including a first matrix representing one or more existing process flows by at least indicating one or more actions that are performed on a document to generate a subsequent document, the first matrix further indicating a frequency with which each of the one or more actions are performed on the document in the one or more existing process flows to generate the subsequent document, the machine-learning model being trained, based at least on the first matrix, to identify a next action maximizing an overall frequency of a sequence actions including the next action;
    receiving an indication of a first document being created as part of a process flow; and
    in response to the indication, applying the trained machine-learning model to generate a recommendation to perform, as part of the process flow, a first action to generate a second document.

11. The method of claim 10, wherein the first matrix further indicates a frequency that the one or more actions are performed on the document to generate the subsequent document.

12. The method of claim 10, wherein the machine-learning model is trained to recommend the first action instead of a second action based at least on the process flow including the first action having a higher conformation metric than another process flow including the second action, and wherein the conformation metric of the process flow corresponds to a sum of frequencies of a sequence of actions included in the process flow.

13. The method of claim 12, wherein the machine-learning model is trained to recommend the first action having a lower individual frequency than the second action in order to form the process flow having the higher conformation metric.

14. The method of claim 10, wherein the first matrix is converted to a second matrix prior to being used to train the machine-learning model, wherein the second matrix indicates the subsequent document that is generated in response to the one or more actions being performed on the document, and wherein the second matrix further indicates a frequency of the subsequent document being generated as a response to the one or more actions being performed on the document.

15. The method of claim 14, wherein the first matrix and the second matrix correspond to at least one directed graph representative of the one or more existing process flows, wherein the at least one directed graph include a plurality of nodes corresponding to the document and the subsequent document, and wherein the at least one directed graph further include at least one edge corresponding to the one or more actions.

16. The method of claim 10, wherein the machine-learning model comprises a Markov Decision Process model.

17. The method of claim 10, wherein the machine-learning model is trained using a reinforcement training technique comprising Q-learning, Monte Carlo, state-actionreward-state-action, deep Q network, deep deterministic policy gradient, asynchronous actor-critic algorithm, trust region policy optimization, and/or proximal policy optimization.

18. A non-transitory computer-readable medium storing instructions, which when executed by at least one data processor, result in operations comprising:

training a machine-learning model by at least processing training data with the machine-learning model, the training data including a first matrix representing one or more existing process flows by at least indicating one or more actions that are performed on a document to generate a subsequent document, the first matrix further indicating a frequency with which each of the one or more actions are performed on the document in the one or more existing process flows to generate the subsequent document, the machine-learning model being trained, based at least on the first matrix, to identify a next action maximizing an overall frequency of a sequence actions including the next action;

receiving an indication of a first document being created as part of a process flow; and in response to the indication, applying the trained machine-learning model to generate a recommendation to perform, as part of the process flow, a first action to generate a second document.

\* \* \* \* \*